(12) United States Patent
Takeda

(10) Patent No.: US 11,533,191 B2
(45) Date of Patent: Dec. 20, 2022

(54) APPARATUS CONTROL SYSTEM AND APPARATUS CONTROL METHOD

(71) Applicant: Mitsubishi Electric Corporation, Tokyo (JP)

(72) Inventor: Emi Takeda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 240 days.

(21) Appl. No.: 16/976,136

(22) PCT Filed: Apr. 17, 2018

(86) PCT No.: PCT/JP2018/015883
§ 371 (c)(1),
(2) Date: Aug. 27, 2020

(87) PCT Pub. No.: WO2019/202666
PCT Pub. Date: Oct. 24, 2019

(65) Prior Publication Data
US 2020/0412570 A1 Dec. 31, 2020

(51) Int. Cl.
*G10L 15/22* (2006.01)
*H04L 12/28* (2006.01)
(Continued)

(52) U.S. Cl.
CPC .......... *H04L 12/2816* (2013.01); *G10L 15/22* (2013.01); *G10L 15/30* (2013.01);
(Continued)

(58) Field of Classification Search
CPC ................. H04L 12/2816; H04L 67/10; H04L 2012/2849; H04L 2012/285; H04L 12/282;
(Continued)

(56) References Cited

U.S. PATENT DOCUMENTS 10,504,516 B2 * 12/2019 Barth .................... G06F 16/683
2016/0373269 A1 12/2016 Okubo et al.
(Continued)

FOREIGN PATENT DOCUMENTS

JP H07-039877 B2 5/1995
JP 2006-119920 A 5/2006
(Continued)

OTHER PUBLICATIONS

Office Action dated May 12, 2022 issued in corresponding EP patent application No. 18915597.1.
(Continued)

*Primary Examiner* — Abul K Azad
(74) *Attorney, Agent, or Firm* — Posz Law Group, PLC

(57) ABSTRACT

A voice inputting device inputs a voice operation of a user, and transmits voice data based on the voice operation to a first cloud server. The first cloud server receives the voice data from the voice inputting device, analyzes the received voice data, and determines an operational skill level of the user and the details of the voice operation. A second cloud server generates a control command for an air conditioner based on the operational skill level and the details of the voice operation determined by the first cloud server, and transmits the generated control command to the air conditioner.

6 Claims, 12 Drawing Sheets

TARGET TEMPERATURE:
26°C TO 27°C

TARGET TEMPERATURE:
26°C TO 26.1°C

(51) Int. Cl.
  *G10L 15/30* (2013.01)
  *H04L 67/10* (2022.01)
(52) U.S. Cl.
  CPC .. *G10L 2015/223* (2013.01); *G10L 2015/227* (2013.01); *H04L 67/10* (2013.01)
(58) Field of Classification Search
  CPC ............. H04L 12/2827; H04L 12/2829; H04L 67/125; G10L 15/22; G10L 15/30; G10L 2015/223; G10L 2015/227; G06F 3/167; G06F 13/00; H04W 4/33
  See application file for complete search history.

(56) References Cited

U.S. PATENT DOCUMENTS

| | | | |
|---|---|---|---|
| 2017/0116986 A1* | 4/2017 | Weng | ...................... G10L 15/22 |
| 2017/0242657 A1 | 8/2017 | Butts et al. | |
| 2018/0103039 A1* | 4/2018 | Thaler | ................. H04L 41/0806 |
| 2019/0057703 A1* | 2/2019 | Zeinstra | .................. G06F 3/167 |

FOREIGN PATENT DOCUMENTS

| | | | | |
|---|---|---|---|---|
| JP | 2006-301652 A | 11/2006 | | |
| JP | 2009-104020 A | 5/2009 | | |
| JP | 6025091 B2 | 11/2016 | | |
| JP | 2017-010176 A | 1/2017 | | |
| WO | WO-2014098477 A1 * | 6/2014 | ............ | G08C 17/02 |
| WO | 2019/198222 A1 | 10/2019 | | |

OTHER PUBLICATIONS

Extended European Search Report dated Apr. 1, 2021, issued in corresponding EP Patent Application No. 18915597.1.

International Search Report dated Jul. 10, 2018 issued in the corresponding International Application No. PCT/JP2018/015883 (and English translation).

* cited by examiner

FIG.6

| Utterance | Instruction details |
|---|---|
| "Start operation" | Start operation |
| "Stop" | Stop |
| "Increase temperature" | Increase target temperature |
| "Decrease temperature" | Decrease target temperature |
| "Airflow up" | Change airflow direction upwardly |
| "Airflow down" | Change airflow direction downwardly |
| "Increase airflow" | Increase blowout air amount |
| "Decrease airflow" | Decrease blowout air amount |
| ... | ... |

FIG.7

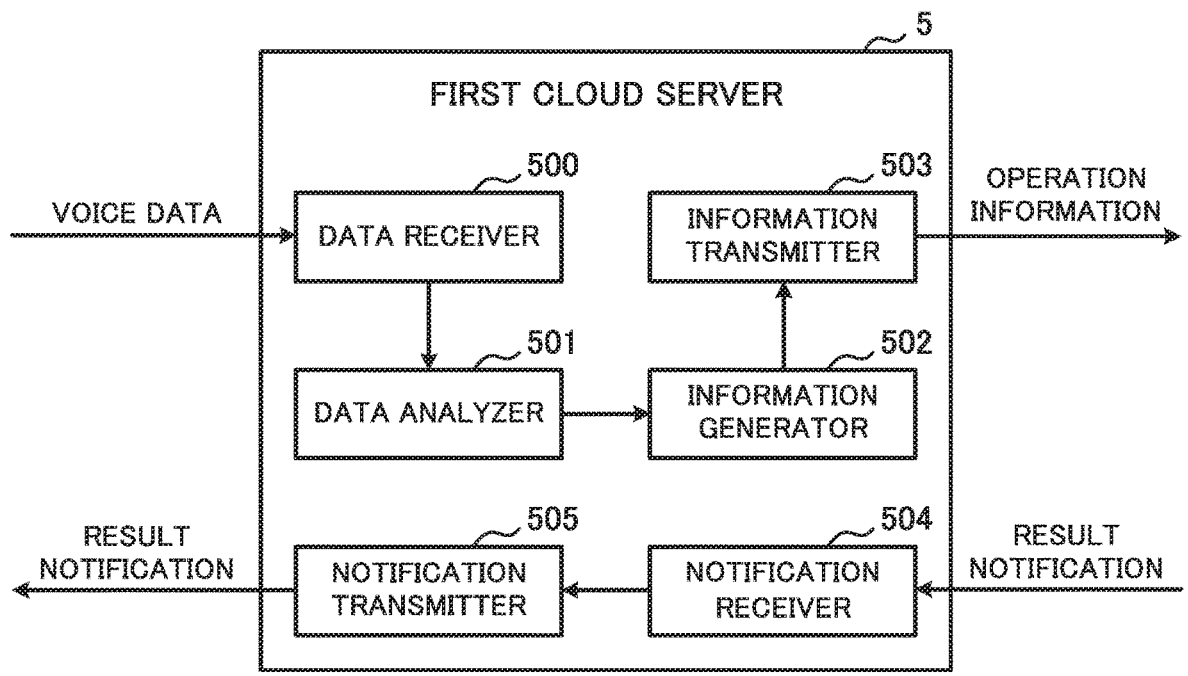

| Operational skill level | Control target items | | | |
|---|---|---|---|---|
| | Target temperature | Blowout air amount | Airflow direction | ... |
| 1 | 1°C | 1/3 increments | 1/3 increments | ... |
| 2 | 0.5°C | 1/5 increments | 1/5 increments | ... |
| 3 | 0.1°C | 1/10 increments | 1/10 increments | ... |

643

APPARATUS CONTROL SYSTEM AND APPARATUS CONTROL METHOD

CROSS REFERENCE TO RELATED APPLICATION

This application is a U.S. national stage application of International Patent Application No. PCT/JP2018/015883 filed on Apr. 17, 2018, the content of which is incorporated herein by reference.

TECHNICAL FIELD

The present disclosure relates to an apparatus control system and an apparatus control method.

BACKGROUND

Apparatuses that can accept operation instructions by an utterance of a user are widely known. A wide variety of techniques are proposed regarding such apparatuses (Patent Literature 1, 2, and so on).

Furthermore, in recent years techniques enabling operation of Internet-connected apparatuses also known as Internet of Things (JOT) apparatuses, information home appliances, Internet home appliances, and the like by voice operation via an AI speaker (also known as a smart speaker) are achieved, and such techniques are used in typical households.

PATENT LITERATURE

Patent Literature 1: Examined Japanese Patent Application Publication No. H07-39877
Patent Literature 2: Japanese Patent No. 6025091

When voice operation via an AI speaker as mentioned above can be performed, the user can swiftly perform a desired operation for a desired apparatus without the hassle of searching for a dedicated remote controller of the desired apparatus and manually operating the dedicated remote controller. Moreover, with such a technique, the unique characteristics of voice operation can be utilized thereby enabling various instructions and details instructions to be accepted that cannot be input using a conventional dedicated remote controller.

However, in order to achieve operations surpassing those of dedicated remote controllers, such techniques necessitate users to perform more complicated voice operations involving multiple voice inputs, for example. Although it is a generally accepted notion that voice operation is convenient, to elderly people, toddlers, or users who are unaccustomed to voice operations, when voice operations are complex due to the increase in voice inputs, the convenience may decrease or an erroneous operation may occur.

The present disclosure is made with the view of above circumstances, and an objective of the present disclosure is to provide an apparatus control system and the like that achieves suitable apparatus control based on the voice operational skill level of a user.

SUMMARY

In order to achieve the aforementioned objective, an apparatus control system according to the present disclosure includes:
a sound inputting device; and
apparatus control means for controlling an apparatus, wherein
the sound inputting device includes
inputting means for inputting a sound operation of a user, and
transmission means for transmitting to the apparatus control means sound data based on the sound operation, and
the apparatus control means, upon receiving the sound data from the sound inputting device, (i) analyzes the sound data, (ii) determines an operational skill level of the user and details of the sound operation, (iii) generates a control command for the apparatus based on the operational skill level and the details of the sound operation, and (iv) transmits the control command to the apparatus.

The present disclosure can achieve suitable apparatus control based on the voice operational skill level of the user.

BRIEF DESCRIPTION OF DRAWINGS

FIG. 6 is a diagram for description of an interpretation table to be stored in the secondary storage device with which the first cloud server is equipped according to Embodiment 1;
FIG. 7 is a block diagram illustrating a functional configuration of the first cloud server according to Embodiment 1.

DETAILED DESCRIPTION

Hereinafter, the embodiments of the present disclosure are described in detail with reference to the drawings.

Embodiment 1

Figure 1:
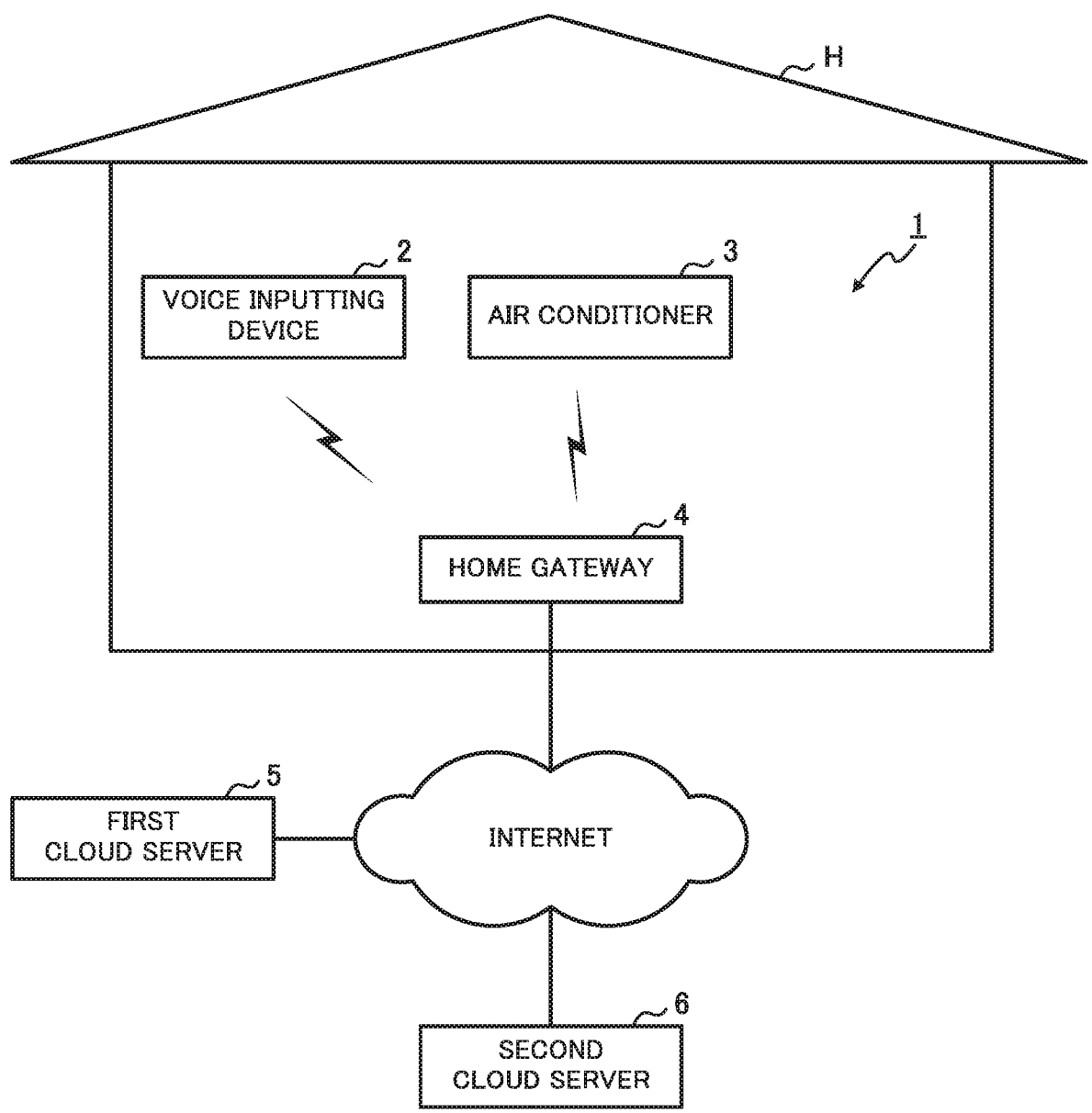
FIG. 1 is a diagram illustrating an overall configuration of an apparatus control system according to Embodiment 1 of the present disclosure.

FIG. 1 is a diagram illustrating an overall configuration of an apparatus control system 1 according to Embodiment 1 of the present disclosure. The apparatus control system 1 is a system that enables control by voice operation of an apparatus installed in a home H. The apparatus control system 1 is equipped with a voice inputting device 2, an air conditioner 3, a home gateway 4, a first cloud server 5, and a second cloud server 6.

Figure 2:
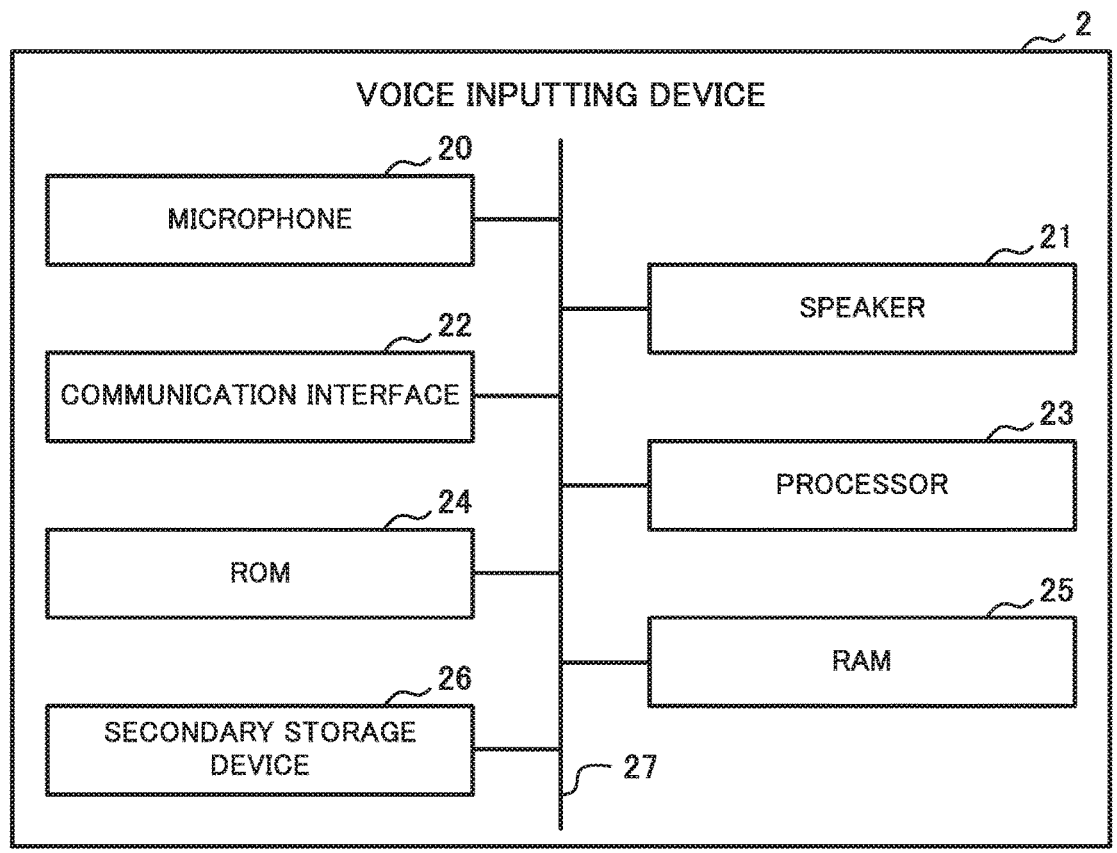
FIG. 2 is a block diagram illustrating a hardware configuration of a voice inputting device according to Embodiment 1.

The voice inputting device 2 is an example of a sound inputting device according to the present disclosure. The voice inputting device 2 is a so-called AI speaker (also known as a smart speaker) that provides various services based on an inputted utterance of the user. The voice inputting device 2, as illustrated in FIG. 2, includes a microphone 20, a speaker 21, a communication interface 22, a processor 23, a read-only memory (ROM) 24, a random-access memory (RAM) 25, and a secondary storage device 26. These components are connected to one another via a bus 27.

The microphone 20 inputs an utterance of the user, converts the utterance to a digital voice signal, and transmits the digital voice signal to the processor 23. The speaker 21 outputs voice corresponding to the digital voice signal transmitted from the processor 23.

The communication interface 22 includes a network card for communicably connecting by wire or wirelessly with the home gateway 4 that functions as a broadband router and for communicating via the home gateway 4 with other devices including the first cloud server 5 that are to be connected to the Internet.

The processor 23 comprehensively controls this voice inputting device 2. The functions of the voice inputting device 2, which are achieved by the processor 23, are described in detail further below. The ROM 24 stores multiple firmware programs and data to be used when the firmware programs are executed. The RAM 25 is used as a working area of the processor 23.

The secondary storage device 26 includes a hard disk drive (HDD) or a readable and writeable non-volatile semiconductor memory. Examples of the readable and writeable non-volatile semiconductor memory include an electrically erasable programmable read-only memory (EEPROM) and a flash memory. The secondary storage device 26 stores a voice operation inputting program and data to be used when the voice operation inputting program is executed, neither of which are illustrated. The voice operation inputting program is a program having recorded thereon (i) processing for inputting a voice operation of a user and transmitting to the first cloud server 5 voice data based on the inputted voice operation and (ii) processing for receiving a result notification from the first cloud server 5 and outputting voice based on the received result notification.

Figure 3:
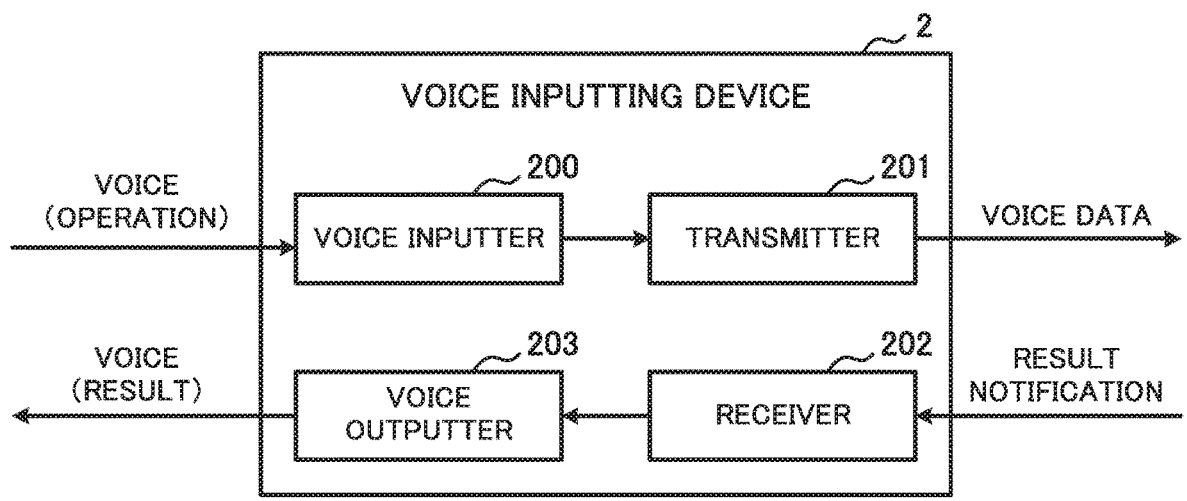
FIG. 3 is a block diagram illustrating a functional configuration of the voice inputting device according to Embodiment 1.

The voice inputting device 2 functionally includes a voice inputter 200, a transmitter 201, a receiver 202, and a voice outputter 203, as illustrated in FIG. 3. These functional components are achieved by the processor 23 executing the voice operation inputting program stored in the secondary storage device 26.

The voice inputter 200 is an example of inputting means according to the present disclosure. The voice inputter 200 inputs a voice operation by the user and generates voice data based on the inputted voice operation. Specifically, the voice inputter 200 applies pulse code modulation (PCM) to the analog voice signal indicating the voice of a user to convert the analog voice signal into a digital voice signal, and further applies lossy compression to the digital voice signal to generate voice data.

The transmitter 201 is an example of transmission means according to the present disclosure. The transmitter 201 transmits the voice data generated by the voice inputter 200 to the first cloud server 5 via the home gateway 4.

The receiver 202 receives, via the home gateway 4, a result notification transmitted from the first cloud server 5. The result notification indicating whether or not a control based on the voice operation of the user by the second cloud server 6 for the air conditioner 3 is performed. The voice outputter 203 outputs voice based on the voice data corresponding to the result notification received by the receiver 202. The voice data corresponding to the result notification is stored in advance in the secondary storage device 26. For example, if the result notification indicates that the control based on the voice operation of the user by the second cloud server 6 for the air conditioner 3 is performed, the voice outputter 203 outputs the following verbal message, "operation successful". Conversely, if the result notification indicates that the control based on the voice operation of the user by the second cloud server 6 for the air conditioner 3 is not performed, the voice outputter 203 outputs the following verbal message, "operation cannot be performed".

The air conditioner 3 is an example of an apparatus according to the present disclosure. The air conditioner 3 is an apparatus referred to as a so-called Internet of Things (IoT) apparatus, information home appliance, Internet home appliance, or smart home appliance, and is to be connected to the Internet via the home gateway 4. When a user operates a non-illustrated dedicated remote controller (hereinafter, referred to as the air conditioning remote controller) of the air conditioner 3, the air conditioner 3 operates in accordance with the operation details. For example, the user can manually operate the air conditioning remote controller to issue an instruction to start or stop an operation, to change an operational mode such as cool, heat, dehumidify, blow air, and the like, or to change the target temperature, target humidity, blowout air amount, airflow direction, and the like. Moreover, the second cloud server 6 can also control the operations of the air conditioner 3 which is described further below.

Figure 4:
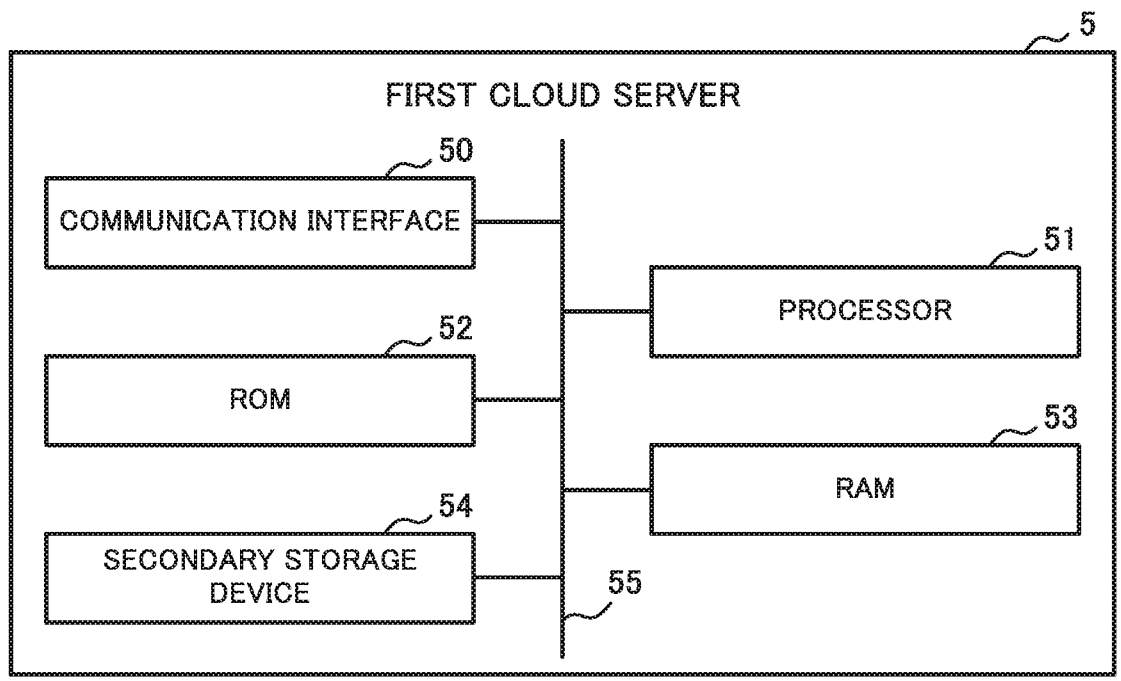
FIG. 4 is a block diagram illustrating a hardware configuration of a first cloud server according to Embodiment 1.

The first cloud server 5 is an example of a first cloud server according to the present disclosure. The first cloud server 5 is a server computer that is to be installed and run by a manufacturer, sales company, or the like of the voice inputting device 2. The first cloud server 5 includes functions of a standard Web server and is to be connected to the Internet. The first cloud server 5 cooperates with the second cloud server 6, which is described further below, to provide a voice operation service to a customer. The first cloud server 5, as illustrated in FIG. 4, includes a communication interface 50, a processor 51, a ROM 52, a RAM 53, and a secondary storage device 54. These components are connected to one another via a bus 55.

The communication interface 50 is connected to the Internet and is an interface for communicating with other devices such as the home gateway 4, the second cloud server 6, and the like. The processor 51 comprehensively controls the first cloud server 5. Details of the functions of the first cloud server 5, which are achieved by the processor 51, are described further below.

The ROM 52 stores multiple firmware programs and data that is to be used during execution of these firmware programs. The RAM 53 is used as a working area of the processor 51.

Figure 5:
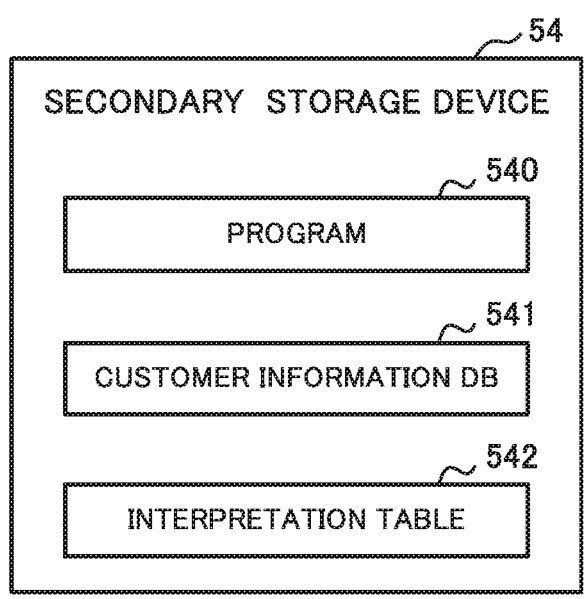
FIG. 5 is a diagram for description of a secondary storage device with which the first cloud server is equipped according to Embodiment 1.

The secondary storage device 54 is a large-capacity storage device that includes an HDD or a readable and writeable non-volatile semiconductor memory. Examples of the readable and writeable non-volatile semiconductor memory include an EEPROM and a flash memory. The secondary storage device 54, as illustrated in FIG. 5, stores a program 540, a customer information database (DB) 541, and an interpretation table 542. The secondary storage device 54 also stores, for example, a voice recognition DB that is a database for voice recognition.

The program 540 is a program for achieving the voice operation service. The program 540 has recorded therein processing for analyzing the voice data transmitted from the voice inputting device 2, generating operation information, and transmitting the generated operation information to the second cloud server 6.

The customer information DB 541 is a database for managing information (hereinafter, referred to as the first customer information) regarding customers who have purchased the voice inputting device 2 and are members of the voice operation service. The first customer information is generated and registered into the customer information DB 541, when a user, after purchase of the voice inputting device 2, accesses the first cloud server 5 via a smartphone or home PC for example and performs the procedures for becoming member to enjoy the voice operation service.

The first customer information contains customer identification (ID), a password, an email address of, for example, the smartphone or PC of the customer, a serial number of the voice inputting device 2 purchased by the customer, an internet protocol (IP) address of the home gateway 4 of the customer home, an IP address of the voice inputting device 2, and a serial number of the air conditioner 3.

The interpretation table 542 is a data table to be used when a voice operation of the user is to be interpreted. Specifically, as illustrated in FIG. 6, the interpretation table 542 has registered therein multiple records in which utterances of a user and details of voice operations, that is, instruction details for the air conditioner 3, are in association with one another.

Next, the functions of the first cloud server 5 are described. As illustrated in FIG. 7, the first cloud server 5 functionally includes a data receiver 500, a data analyzer 501, an information generator 502, an information transmitter 503, a notification receiver 504, and a notification transmitter 505. These functional components are achieved by the processor 51 executing the program 540 stored in the secondary storage device 54.

The data receiver 500 is an example of data receiving means according to the present disclosure. The data receiver 500 receives voice data transmitted from the voice inputting device 2. The data receiver 500 saves the received voice data in the RAM 53 or the secondary storage device 54. The data analyzer 501 is an example of analyzing means according to the present disclosure. The data analyzer 501 analyzes the voice data received by the data receiver 500, and then determines a voice operational skill level of the user (hereinafter, referred to as "operational skill level") and details of the voice operation (that is, the instruction details for air conditioner 3).

The operational skill level refers to a skill proficiency level in voice operation of the user, that is, how accustomed the user is to voice operation. In the present embodiment, operational skill level is indicated by a value from 1 to 3. If the operational skill level is "1", this is indication that the extent to which the user is accustomed to the voice operation is low. If the operational skill level is "2", this is indication that the extent to which the user is accustomed to voice operation is normal. If the operational skill level is "3" this is indication that the extent to which the user is accustomed to voice operation is high.

The data analyzer 501 analyzes the voice data by a known technique, estimates the age of the user, and determines the operational skill level of the user based on the estimated age. For example, the data analyzer 501 determines that the operational skill level is "1" if the estimated age is 0 to 9 years old or 70 to any age above 70, determines that the operational skill level is "2" if the estimated age is 10 to 14 years old or 50 to 69 years old, and determines that the operational skill level is "3" if the estimated age is 15 to 49 years old.

The data analyzer 501 also analyzes the voice data by a known voice recognition technique with use of the voice recognition DB, and then specifies an utterance of the user. Then, the data analyzer 501 determines, based on the specified utterance and the interpretation table 542 (refer to FIG. 6), the instruction details, that is, the details of the voice operation.

The information generator 502 is an example of information generation means according to the present disclosure. The information generator 502 generates operation information containing the details of the voice operation and operational skill level of the user determined by the data analyzer 501 as well as a serial number of the air conditioner 3 which is the target apparatus of the voice operation. The information transmitter 503 is an example of information transmission means according to the present disclosure. The information transmitter 503 transmits the operation information generated by the information generator 502 to the second cloud server 6.

The notification receiver 504 receives the aforementioned result notification from the second cloud server 6. The result notification contains the serial number of the air conditioner 3 which is the control target. The notification transmitter 505 transfers the result notification received by the notification receiver 504 to the voice inputting device 2 corresponding to the air conditioner 3.

The second cloud server 6 is an example of a second cloud server according to the present disclosure. The second cloud server 6 is a server computer that is to be installed and run by a manufacturer, sales company, or the like of the air conditioner 3. The second cloud server 6 includes functions of a standard Web server and is to be connected to the Internet. The second cloud server 6 provides an apparatus management service that includes learning the usage trends of the air conditioner 3 of the customer based on the operation history of the air conditioner 3 of the customer home, automatically controlling the air conditioner 3 based on the learning result, and providing advice regarding power conservation and safety based on the usage trends of the air conditioner 3. As described above, the second cloud server 6 cooperates with the first cloud server 5 to provide voice operation service to the customer. The first cloud server 5 and the second cloud server 6 are examples of apparatus control means according to the present disclosure.

Figure 8:
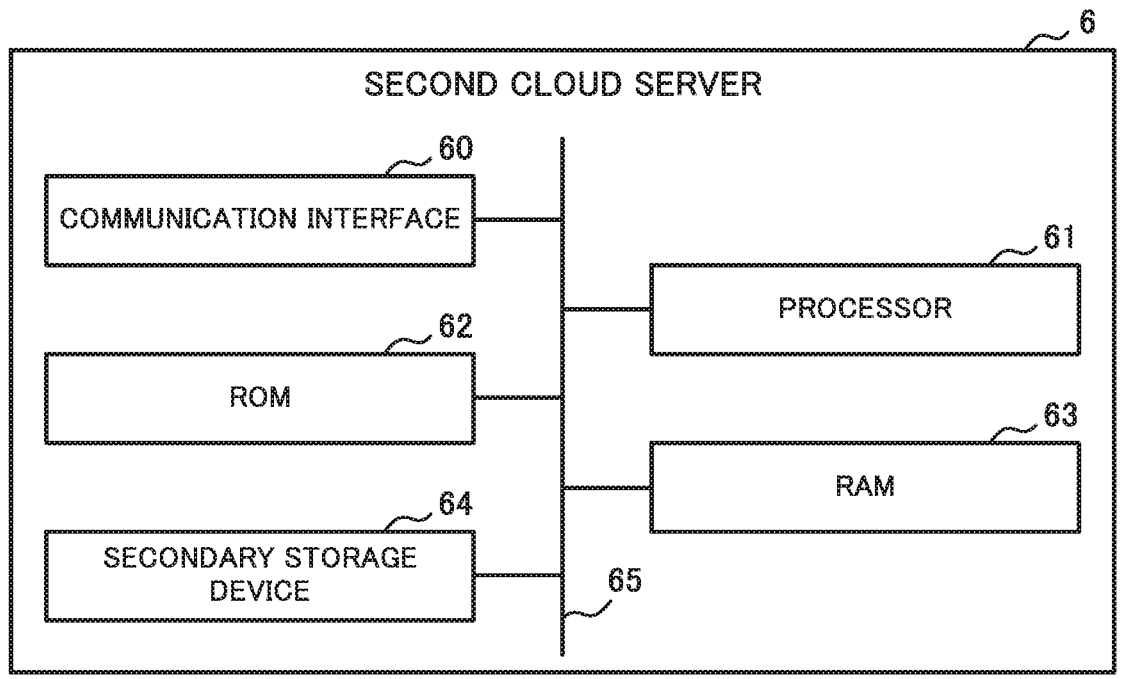
FIG. 8 is a block diagram illustrating a hardware configuration of a second cloud server according to Embodiment 1.

The second cloud server 6, as illustrated in FIG. 8, includes a communication interface 60, a processor 61, a ROM 62, a RAM 63, and a secondary storage device 64. These components are connected to one another via a bus 65.

The communication interface 60 is connected to the Internet and is an interface for communicating with other devices such as the home gateway 4 of each customer home, that is, each home H, the first cloud server 5, and the like. The processor 61 comprehensively controls the second cloud server 6. Details of the functions of the second cloud server 6, which are achieved by the processor 61, are described further below.

The ROM 62 stores multiple firmware programs and data that is to be used during execution of these firmware programs. The RAM 63 is used as a working area of the processor 61.

Figure 9:
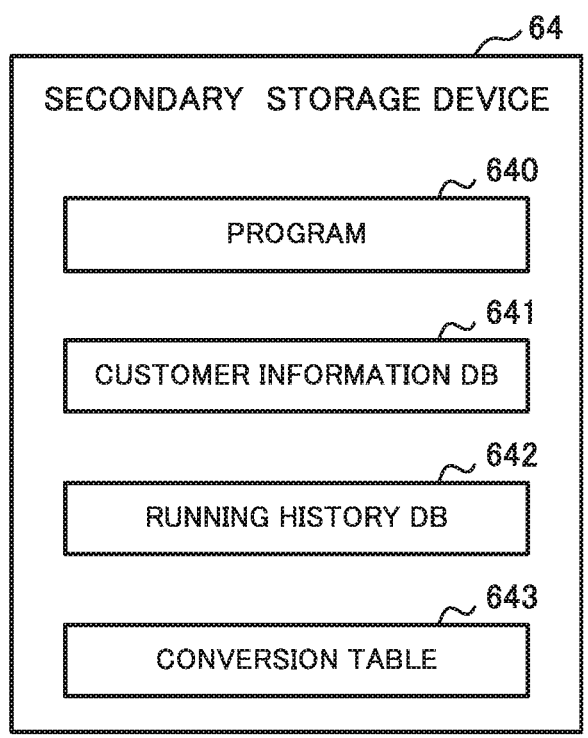
FIG. 9 is a diagram for description of a secondary storage device with which the second cloud server is equipped according to Embodiment 1.

The secondary storage device 64 is a large-capacity storage device that includes an HDD or a readable and writeable non-volatile semiconductor memory. Examples of the readable and writeable non-volatile semiconductor memory include an EEPROM and a flash memory. The secondary storage device 64, as illustrated in FIG. 9, stores a program 640, a customer information DB 641, a running history DB 642, and a conversion table 643. Additionally, the secondary storage device 64 stores various programs such as a program for automatic control of the air conditioner 3 of each customer home, a program for issuing advice regarding power conservation and safety to each customer, and data that is to be used during execution of these programs.

The program 640 is a program for achieving the voice operation service by cooperating with the first cloud server 5. The program 640 has recorded therein processing for controlling the air conditioner 3 based on the operation information transmitted from the first cloud server 5.

The customer information DB 641 is a database for managing information (hereinafter, referred to as the second customer information) regarding customers who have purchased the air conditioner 3 and are members of the apparatus management service. The second customer information is generated and registered into the customer information DB 641, when a user, after purchase of the air conditioner 3, accesses the second cloud server 6 via a smartphone or home PC for example and performs the procedures for becoming a member to enjoy the apparatus management service.

The second customer information contains customer identification (ID), a password, an email address of, for example, the smartphone or PC of the customer, an IP address of the home gateway 4 of the customer home, a serial number of the air conditioner 3 purchased by the customer, and the IP address of the air conditioner 3.

The running history DB 642 is a database in which information (hereinafter, referred to as running information) regarding the running history of the air conditioner 3 of each customer home is stored. At a predetermined time interval (every 10 minutes, for example), the processor 61 collects, from the air conditioner 3 of each customer home, information (hereinafter, referred to as running state information) indicating a current running state. The processor 61 generates running information corresponding to the air conditioner 3 of each customer home based on the running state information collected from each customer home, and stores the running information in the running history DB 642.

Figures 10, 11:
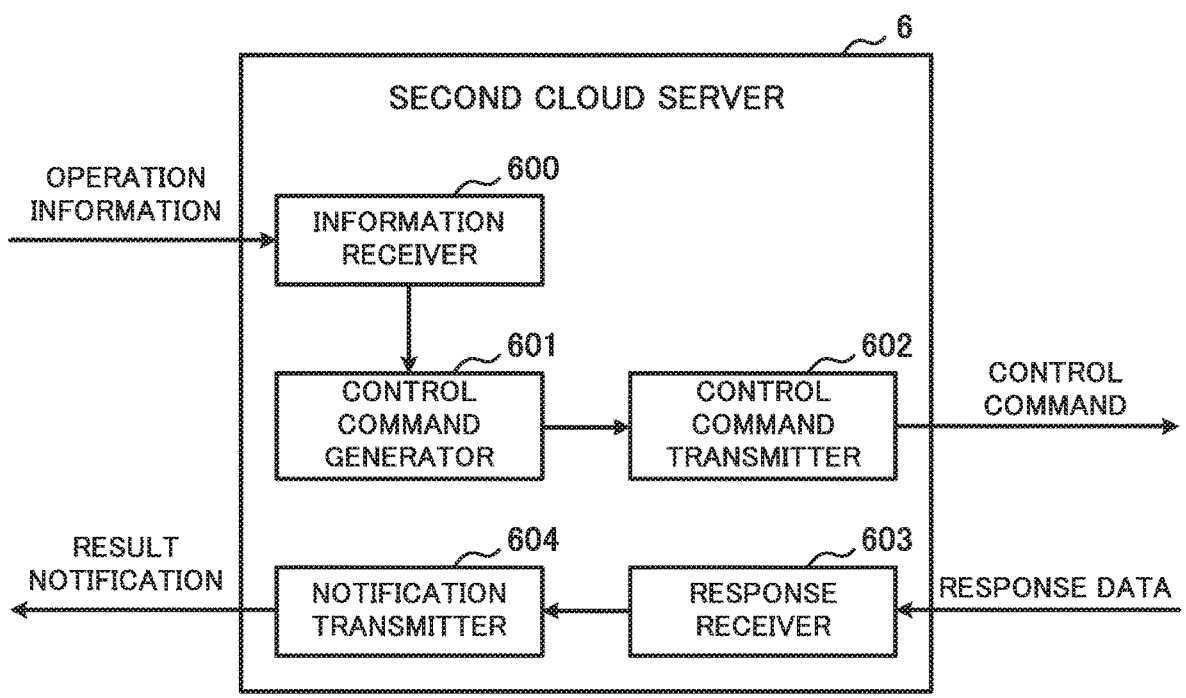
FIG. 10 is a diagram for description of a conversion table to be stored in the secondary storage device with which the second cloud server is equipped according to Embodiment 1.
FIG. 11 is a block diagram illustrating a functional configuration of the second cloud server according to Embodiment 1.

The conversion table 643 is a data table to be used when converting the operational skill level included in the operation information received from the first cloud server 5 to an adjustment unit for the air conditioner 3. Specifically, as illustrated in FIG. 10, the conversion table 643 has registered therein multiple records in which user operational skill levels and adjustment units of control target items are in association with each other. Here, the adjustment unit refers to the minimum width by which control target items such as the target temperature, the airflow direction, and blowout air amount in the air conditioner 3 can be adjusted.

The example in FIG. 10 illustrates that adjustment units with respect to the user operational skill level "1" are "1° C." for the target temperature and ⅓ increments for the blowout air amount and the airflow direction. The example also illustrates that the adjustment units with respect to the user operational skill level "2", are "0.5° C." for the target temperature and ⅕ increments for the blowout air amount and the airflow direction. The example also illustrates that the adjustment units with respect to the user operational skill level "3" are "0.1° C." for the target temperature and 1/10 increments for the blowout air amount and the airflow direction.

Next, the functions of the second cloud server 6 are described. As illustrated in FIG. 11, the second cloud server 6 functionally includes an information receiver 600, a control command generator 601, a control command transmitter 602, a response receiver 603, and a notification transmitter 604. These functional components are achieved by the processor 61 executing the program 640 stored in the secondary storage device 64.

The information receiver 600 is an example of information receiving means according to the present disclosure. The information receiver 600 receives operation information transmitted from the first cloud server 5. This operation information contains an operational skill level of a user who performed the voice operation, the details of the voice operation (that is the instruction details), and the serial number of the air conditioner 3 as described above.

The control command generator 601 is an example of control command generation means according to the present disclosure. The control command generator 601 generates, based on the operation information received by the information receiver 600, a control command for controlling the air conditioner 3 of the serial number. Specifically, the control command generator 601 determines adjustment units of the control target items by referring to the conversion table 643. For example, in a case where the operational skill level is "1" and the instruction details are to increase the target temperature, the control command generator 601 determines that the adjustment unit is "1° C.". In this case, the control command generator 601 generates a control command for the air conditioner 3 instructing the air conditioner 3 to change the target temperature to the current target temperature+1° C.

Alternatively, in a case where the operational skill level is "2" and the instruction details are to change the airflow direction downwardly, the control command generator 601 determines that the adjustment unit is "⅕ increments". In this case, the control command generator 601 generates a control command for the air conditioner 3 instructing the air conditioner 3 to change to a state in which the airflow direction is lowered by a ⅕ increment downwardly from the current airflow direction.

As yet another alternative, in a case where the operational skill level is "3" and the instruction details are to increase the blowout air amount, the control command generator 601 determines that the adjustment unit is "1/10 increments". In this case, the control command generator 601 generates a command for the air conditioner 3 instructing the air conditioner 3 to change to a state in which the blowout air amount is increased by a 1/10 increment from the current air amount.

In a case where the instruction details are to start the operation, the control command generator 601 generates a command for causing the air conditioner 3 to start operation in a pre-stoppage state. However, in a case where the adjustment units of the blowout air amount and the airflow direction prior to stoppage are not associated with the operational skill level of the user who gave the "start operation" instruction this time, the state of the blowout air amount and the airflow direction at the time the operation starts is changed so as to correspond to adjustment units corresponding to the operational skill level of the user who gave the "start operation" instruction this time.

The control command transmitter 602 is an example of control command transmission means according to the present disclosure. The control command transmitter 602 transmits the control command generated by the control command generator 601 to the air conditioner 3. After the control command is transmitted by the control command transmitter 602, the response receiver 603 receives response data sent from the air conditioner 3 that is the transmission destination. This response data contains information indicating whether or not an operation based on the control command is performed. In a case where the response data contains information indicating that the operation based on the control command is performed, the response receiver 603 notifies the notification transmitter 604 that a normal response returned from the air conditioner 3.

Conversely, in a case where the response data contains information indicating that the operation based on the control command is not performed, the response receiver 603 notifies the notification transmitter 604 that a normal response is not returned from the air conditioner 3. Also, in a case where response data from the air conditioner 3 could not be received even after a predetermined amount of time elapsed from the time the control command is transmitted to the air conditioner 3, the response receiver 603 notifies the notification transmitter 604 that a normal response is not returned from the air conditioner 3.

In a case where a normal response is returned from the air conditioner 3, the notification transmitter 604 transmits a result notification indicating that control based on the voice operation of the user is performed to the first cloud server 5. Conversely, in a case where a normal response is not returned from the air conditioner 3, the notification transmitter 604 transmits a result notification indicating that control based on the voice operation of the user is not performed to the first cloud server 5.

Figure 12:
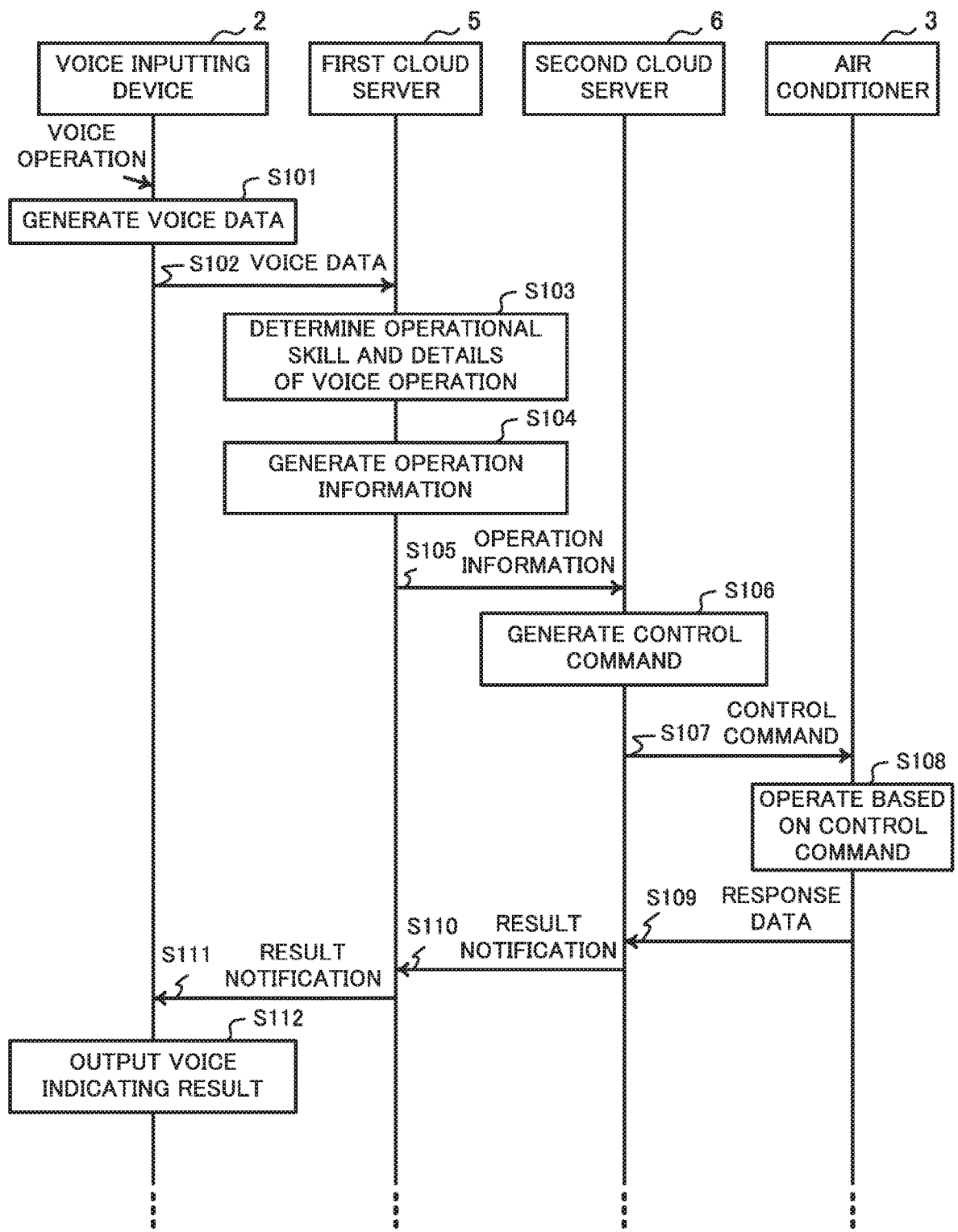
FIG. 12 is a diagram illustrating a flow of processing to be executed by the apparatus control system according to Embodiment 1.

FIG. 12 is a diagram illustrating a flow of processing to be executed by the apparatus control system 1 when a voice operation is performed by a user. When a voice operation is performed by the user, the voice inputting device 2 inputs the voice operation, and generates voice data based on the inputted voice operation (step S101). Then, the voice inputting device 2 transmits the generated voice data to the first cloud server 5 via the home gateway 4 (step S102).

Upon receiving the voice data from the voice inputting device 2, the first cloud server 5 analyzes the received voice data, and determines the operational skill level of the user who performed the voice operation and the details of the voice operation (step S103). The first cloud server 5 generates operation information containing the determined operational skill level and the details of the voice operation as well as the serial number of the air conditioner 3 that is the target apparatus (step S104). Then, the first cloud server 5 transmits the generated operation information to the second cloud server 6 (step S105).

Upon receiving the operation information from the first cloud server 5, the second cloud server 6 generates, based on the operational skill level and the details of the voice operation included in the received operation information, a control command for controlling the air conditioner 3 of the serial number included in the operation information (step S106). Then, the second cloud server 6 transmits the generated control command to the air conditioner 3 (step S107).

Upon receiving the control command transmitted from the second cloud server 6 via the home gateway 4, the air conditioner 3 performs an operation based on the received control command (step S108). For example, the air conditioner 3 changes the target temperature from 26° C. to 26.1° C.

Then, the air conditioner 3 transmits the response data to the second cloud server 6 via the home gateway 4 (step S109). At this time, if the air conditioner 3 executes an operation based on the control command, the air conditioner 3 transmits to the second cloud server 6 the response data including information indicating that the operation based on the control command is performed. Conversely, if for some reason, the operation based on the control command is not performed, the air conditioner 3 transmits response data including information indicating that the operation based on the control command is not performed to the second cloud server 6.

Upon receiving the response data from the air conditioner 3, the second cloud server 6 transmits a result notification in accordance with the details of the received response data to the first cloud server 5 (step S110). This result notification contains information indicating whether or not the control based on the voice operation of the user for the air conditioner 3 is performed and contains the serial number of the air conditioner 3.

Upon receiving the result notification from the second cloud server 6, the first cloud server 5 transfers the received result notification to the voice inputting device 2 corresponding to the air conditioner 3 indicated in the result notification (step S111).

Upon receiving the result notification from the first cloud server 5, the voice inputting device 2 reads, from the secondary storage device 26, voice data corresponding to the received result notification, and outputs voice based on the read voice data (step S112).

Figure 13:
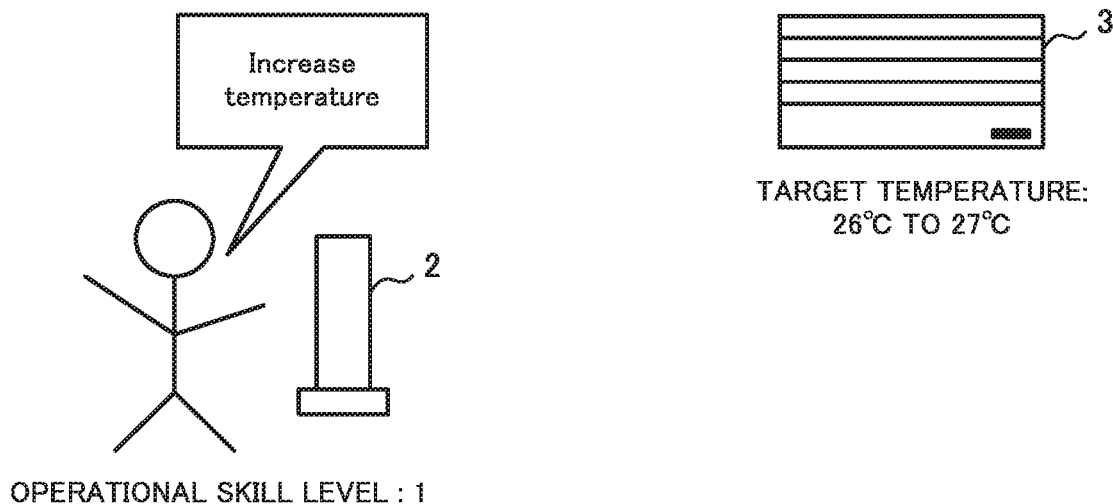
FIG. 13 is a diagram illustrating an example of a control result based on the operational skill level of a user in Embodiment 1.
Figure 14:
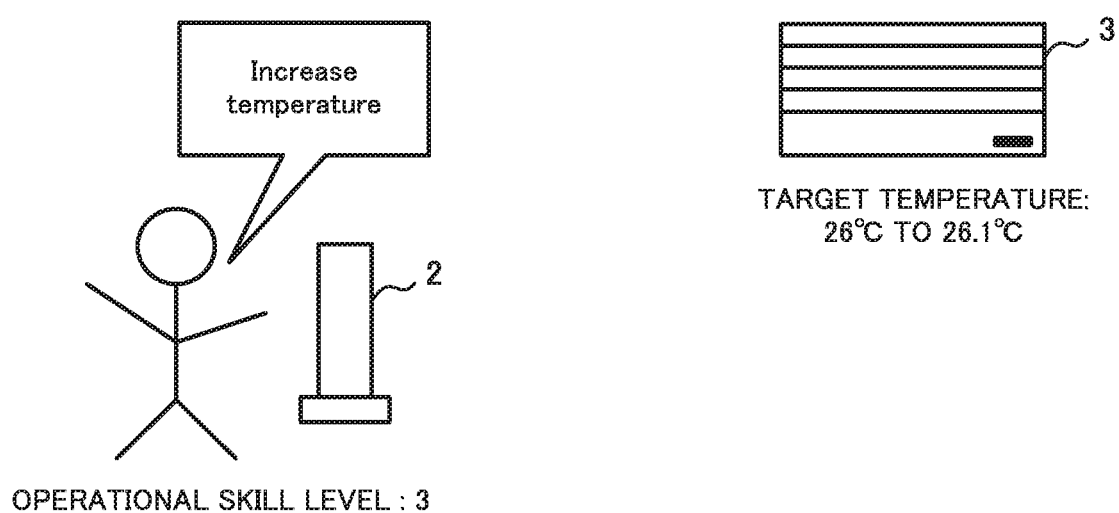
FIG. 14 is a diagram illustrating another example of a control result based on the operational skill level of a user in Embodiment 1.

For example, if a user with an operational skill level of "1" performs an "increase temperature" voice operation, the air conditioner 3 changes the target temperature from 26° C. to 27° C. as illustrated in FIG. 13, by the processing to be executed by the aforementioned apparatus control system 1. If, for example, a user with an operational skill level of "3" performs an "increase temperature" voice operation, the air conditioner 3 changes the target temperature from 26° C. to 26.1° C. as illustrated in FIG. 14.

As described above, in the apparatus control system 1 according to Embodiment 1, when a voice operation is performed by the user via the voice inputting device 2, the first cloud server 5 analyzes the voice data based on the voice operation, and determines the operational skill level of the user and the details of the voice operation. Then, the second cloud server 6 controls the air conditioner 3 based on the operational skill level and the details of the voice operation determined by the first cloud server 5.

By doing so, the apparatus control system 1 provides a user with a high operational skill level more detailed (that is, more minute) air conditioning control in voice operations than air conditioning control in operations performed via a conventional air conditioning remote controller. Also, the apparatus control system 1 provides a user with a low operational skill level air conditioning control at equal level with conventional air conditioning control, that is, air conditioning control in operations performed via the aforementioned air conditioning remote controller. In other words, to a user with a high operational skill level, there is an advantage in that although though voice operation is somewhat more complicated due to the increase in repetitive voice inputs, the user can make subtle adjustments enabling the user to more accurately bring the air-conditioning state to a level that suits the personal preferences of the user. Also, to a user with a low operational skill level, there is an advantage in that although air conditioning on par with conventional air conditioning is provided, the number of repetitive voice inputs to attain this level of air conditioning is low so voice operation is convenient.

As described, the apparatus control system 1 can achieve suitable apparatus control based on the voice operational skill level of the user.

The first cloud server 5 may store, into the secondary storage device 54, a table similar to the conversion table 643 to be stored in the secondary storage device 64 of the second cloud server 6, and may determine the adjustment units of the control target items by referring to the table stored in the secondary storage device 54. In this case, the operation information to be transmitted to the second cloud server 6 from the first cloud server 5 contains details of the voice operation, adjustment units, and the serial number of the air conditioner 3.

Embodiment 2

Next, Embodiment 2 of the present disclosure is described. In the description below, components and the like that are the same as those of Embodiment 1 are assigned the same reference signs, and descriptions thereof are omitted.

Figure 15:
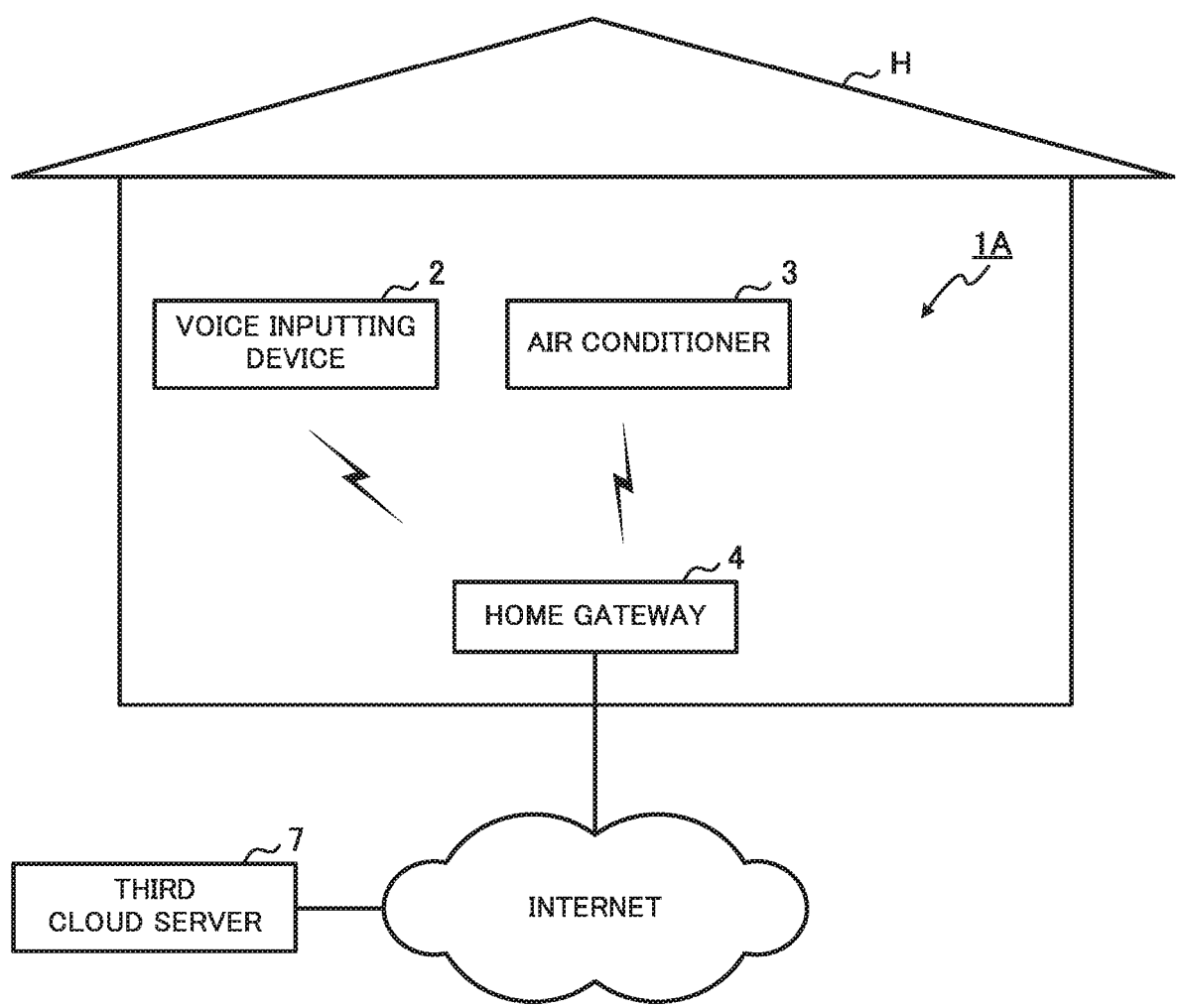
FIG. 15 is a diagram illustrating an overall configuration of an apparatus control system according to Embodiment 2 of the present disclosure.

FIG. 15 is a diagram illustrating an overall configuration of an apparatus control system 1A according to Embodiment 2. The apparatus control system 1A includes the voice inputting device 2, the air conditioner 3, the home gateway 4, and a third cloud server 7. The third cloud server 7 is an example of a third cloud server according to the present disclosure. The third cloud server 7 is a server computer that is to be run and shared by the manufacturer, sales company, or the like of the voice inputting device 2 and the manufacturer, sales company, or the like of the air conditioner 3. The third cloud server 7 includes functions of a standard Web server and is to be connected to the Internet.

The hardware configuration of the third cloud server 7 is similar to either the first cloud server 5 or the second cloud server 6 of Embodiment 1 (refer to FIG. 4 or FIG. 8). Also, the functions of the first cloud server 5 (refer to FIG. 7) and the functions of the second cloud server 6 (refer to FIG. 11) are included in the functions of the third cloud server 7. That is, although a customer is provided with the voice operation service by cooperation between the first cloud server 5 and the second cloud server 6 in Embodiment 1, in the present embodiment, a voice operation service similar to that in Embodiment 1 is accomplished by a single unit of the third cloud server 7.

In the apparatus control system 1A having the aforementioned configuration according to the present embodiment, when a voice operation is performed by the user via the voice inputting device 2, the third cloud server 7 analyzes the voice data based on the voice operation, and determines the operational skill level of the user and the details of the voice operation. Then, the third cloud server 7 generates, based on the determined operational skill level and the details of the voice operation, a control command for controlling the air conditioner 3. Then, the third cloud server 7 transmits the generated control command to the air conditioner 3.

By doing so, the apparatus control system 1A can attain an advantageous effect equal to that of the apparatus control system 1 according to Embodiment 1.

Embodiment 3

Next, Embodiment 3 of the present disclosure is described. In the description below, components and the like that are the same as those of Embodiment 1 are assigned the same reference signs, and descriptions thereof are omitted.

Figure 16:
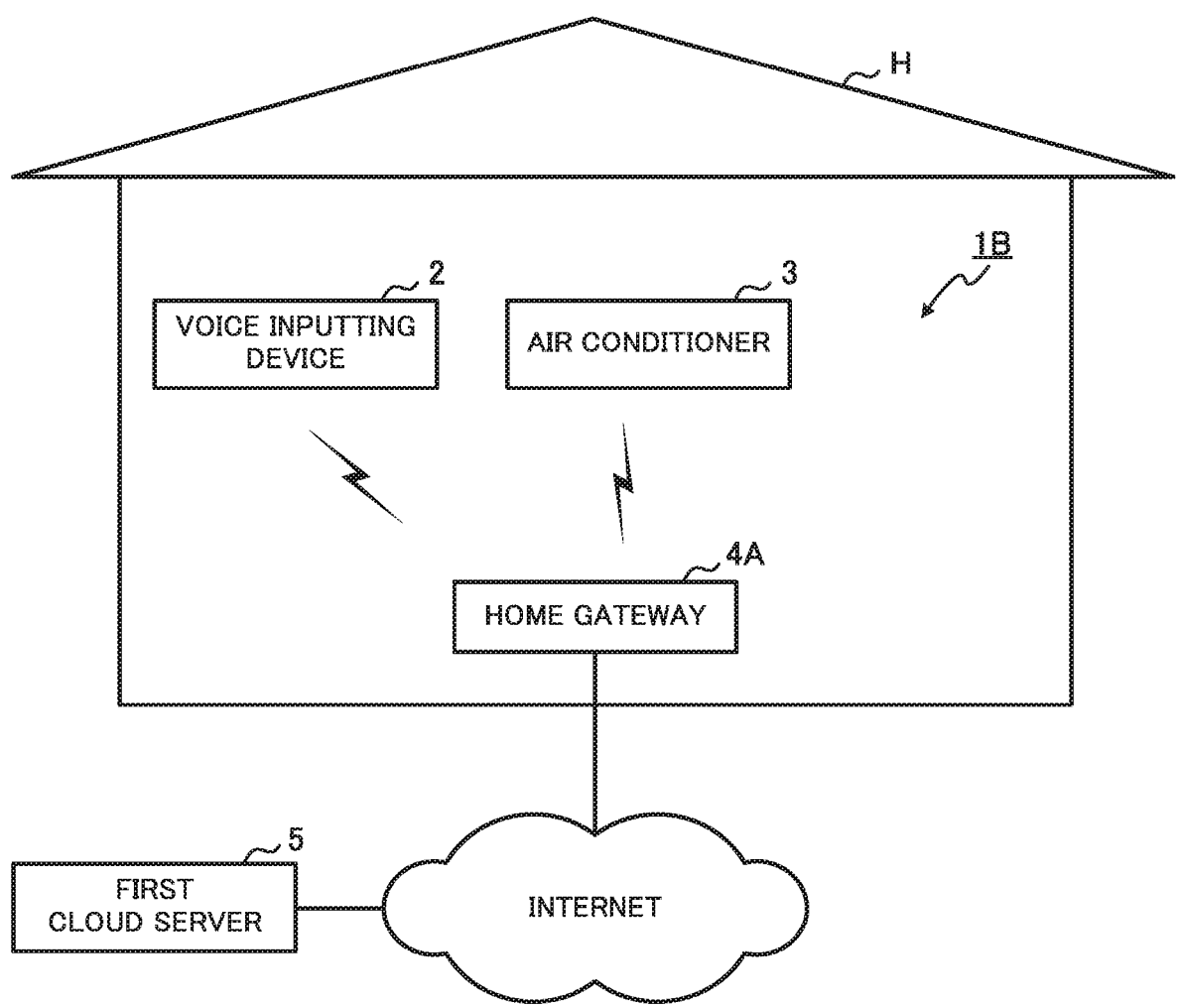
FIG. 16 is a diagram illustrating an overall configuration of an apparatus control system according to Embodiment 3 of the present disclosure.

FIG. 16 is a diagram illustrating an overall configuration of an apparatus control system 1B according to Embodiment 3. The apparatus control system 1B includes the voice inputting device 2, the air conditioner 3, a home gateway 4A, and the first cloud server 5.

The home gateway 4A is an example of a home controller according to the present disclosure. The home gateway 4A includes functions of a broadband router and further includes functions similar to those of the second cloud server 6 according to Embodiment 1 (refer to FIG. 11). The home gateway 4A is a home energy management system (HEMS) controller, for example.

In the apparatus control system 1B having the aforementioned configuration according to the present embodiment, when a voice operation is performed by the user via the voice inputting device 2, the first cloud server 5 analyzes the voice data based on the voice operation, and determines the operational skill level of the user and the details of the voice operation. Then, the first cloud server 5 generates operation information containing the determined operational skill level and the details of the voice operation, and transmits the generated operation information to the home gateway 4A. The home gateway 4A receives the operation information from the first cloud server 5 and controls the air conditioner 3 based on the operational skill level and the details of the voice operation included in the received operation information.

By doing so, the apparatus control system 1B can attain an advantageous effect equal to that of the apparatus control system 1 according to Embodiment 1 and the apparatus control system 1A according to Embodiment 2.

Embodiment 4

Next, Embodiment 4 of the present disclosure is described. In the description below, components and the like that are the same as those of Embodiment 1 are assigned the same reference signs, and descriptions thereof are omitted.

Figure 17:
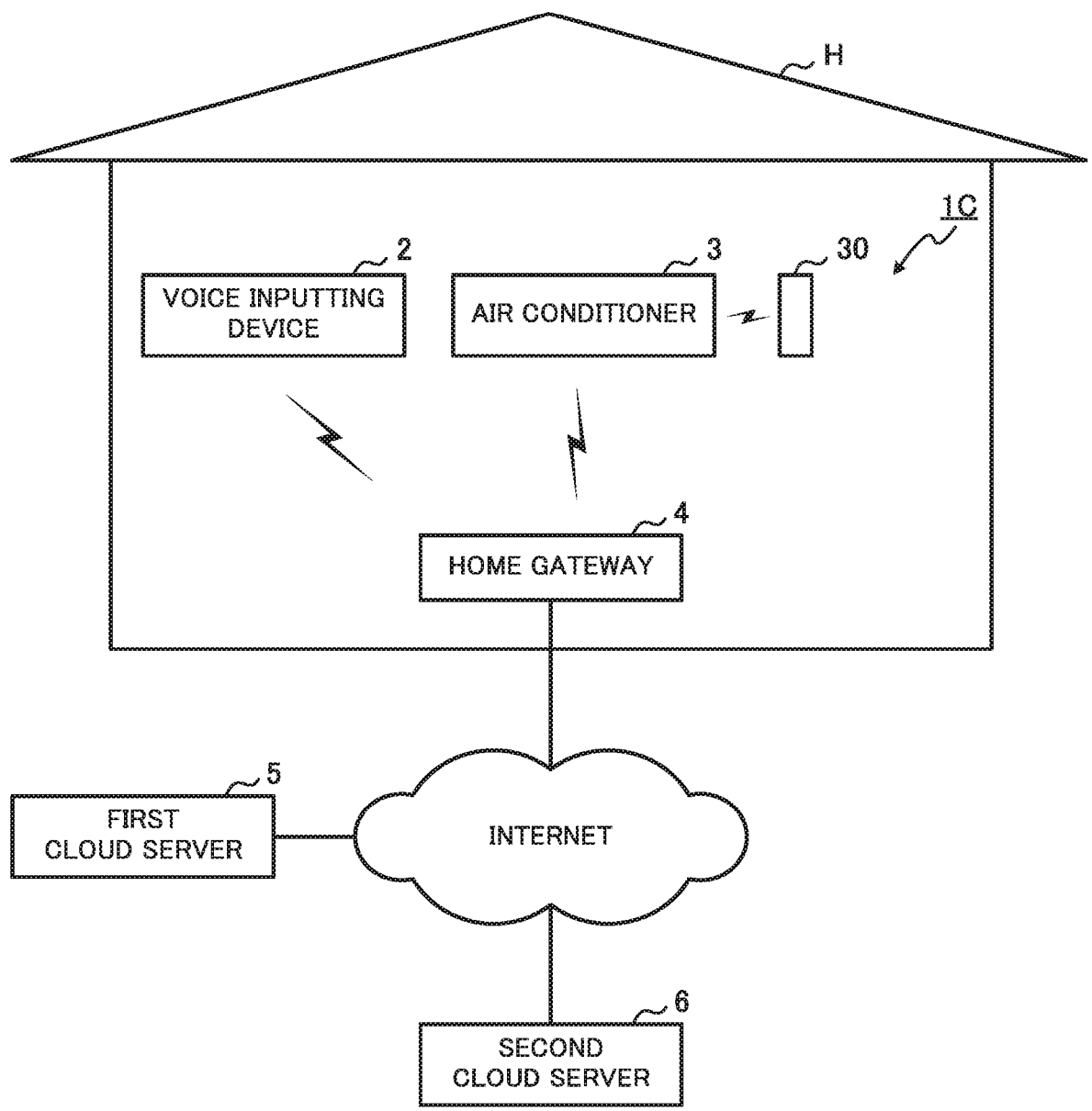
FIG. 17 is a diagram illustrating an overall configuration of an apparatus control system according to Embodiment 4 of the present disclosure.

As illustrated in FIG. 17, an apparatus control system 1C according to Embodiment 4 is a configuration including the configuration of the apparatus control system 1 according to Embodiment 1 and a remote controller 30. The remote controller 30 is an example of a terminal according to the present disclosure. The remote controller 30 is a dedicated air conditioning remote controller of the air conditioner 3 and is communicably connectable to the air conditioner 3 by wire or wirelessly.

The remote controller 30 includes, although not illustrated, an input device, a display, a communication interface for communicating with the air conditioner 3, a processor, a ROM, a RAM, and a readable and writeable non-volatile semiconductor memory. Examples of the input device include a push button, a touch panel, and a touch pad. Examples of the display include an organic EL device and a liquid crystal display. Examples of the readable and writeable non-volatile semiconductor memory include an EEPROM and a flash memory.

For example, it is conceivable that a user with an operational skill level that is not low may prefer to, after starting operation of the air conditioner 3 by voice operation, make an air-conditioning adjustment manually by the remote controller 30 rather than by voice operation depending on, for example, the physical state of the user at that time. In order to accommodate such a situation, when the air conditioner 3 performs an operation (for example, start operation, target temperature change, and the like) based on the voice operation of the user, the remote controller 30 displays an operation screen based on the operational skill level of the user on the display.

Figure 18:
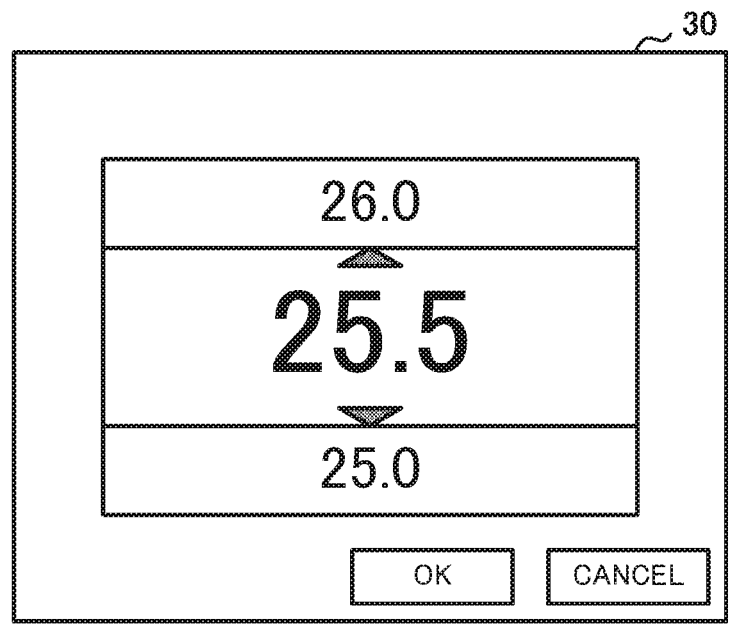
FIG. 18 is a diagram illustrating an example of an operation screen based on the operational skill level of a user in Embodiment 4.
Figure 19:
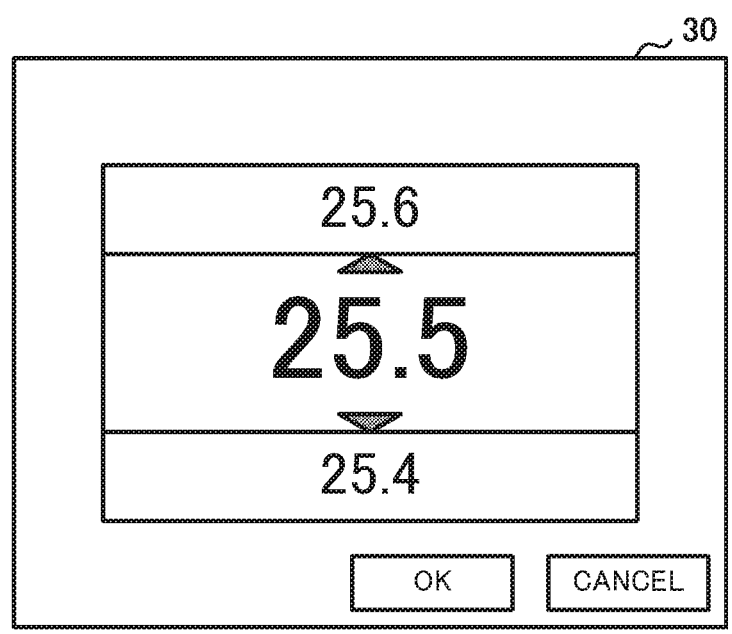
FIG. 19 is a diagram illustrating an example of an operation screen based on the operational skill level of another user in Embodiment 4.

For example, if the air conditioner 3 is starts operation by a user with an operational skill level of "2" by performing the "start operation" voice operation, the remote controller 30 displays an operation screen such as that illustrated in FIG. 18 on the display. On the operation screen illustrated in FIG. 18, the user can change the target temperature at 0.5° C. increments from 25.5° C. which is the current setting value by operating the up and down scroll buttons. Also, if the air conditioner 3 starts operation by a user with an operational skill level of "3" by using the "start operation" voice operation, the remote controller 30 displays an operation screen such as that illustrated in FIG. 19 on the display. On the operation screen illustrated in FIG. 19, the user can change the target temperature at 0.1° C. increments from 25.5° C. which is the current setting value by operating the up and down scroll buttons.

The apparatus control system 1C with the aforementioned configuration according to the present embodiment can attain an advantageous effect equal to that of the apparatus control system 1 according to Embodiment 1. Furthermore, in the apparatus control system 1C, the remote controller 30 displaying the operation screen based on the operational skill of the user on the display enables the user to manually input an operation based on operational skill level of the user. Therefore, usability can be enhanced.

The operation screen based on the operational skill of the user may be displayed on a smart device such as a smartphone, a tablet terminal, and the like of the user, and the operation of the user may be accepted via the smart device.

The present disclosure is not limited to the above embodiments, and various modifications can, of course, be made without departing from the scope of the invention.

For example, the apparatus to be controlled in the present disclosure is not limited to an air conditioner. Examples of apparatuses to be controlled include a light, a floor heating system, a floor heating and cooling system, a television, and a water heater. The apparatuses to be controlled may be various apparatuses such as apparatuses referred to as IoT apparatuses, information home appliances, Internet home appliances, and smart home appliances. For example, in a case where a light is to be controlled, a user with a high operational skill level is provided with a more detailed, that is, more minute illumination control (for example, control of illumination intensity and color temperature) than a person with a low operational skill level.

Also, in the aforementioned embodiments, although a single unit of the air conditioner 3 is used as an example of the control target, multiple units of apparatuses installed in the home H may be set as the control targets. In such a case, apparatuses of product types different from one another may be included as the multiple units of apparatuses.

Also, the features of the apparatus control system 1C in Embodiment 4 may be incorporated into the apparatus control system 1A of Embodiment 2 or the apparatus control system 1B of Embodiment 3.

Also, a configuration that provides a voice operation service through cooperation among three or more cloud servers may be used.

Also, the adjustment amount of the apparatus such as the air conditioner 3 may be changed based on the volume of the voice operation. In such a case, the louder the volume is, the greater the adjustment amount.

Also, the first cloud server 5, the second cloud server 6, the third cloud server 7, or the home gateway 4A may specify a user who performed a voice operation and may control the air conditioner 3 by also taking into account the air conditioning preferences of the user. Specification of the user is performed by comparing the voice operation against preregistered voice data of the user or by analyzing an image captured by a camera, for example. It is sufficient if the air conditioning preferences of a user are registered into the first cloud server 5, the second cloud server 6, the third cloud server 7, or the home gateway 4A in advance by the user or a representative of the home H. Alternatively, the first cloud server 5, the second cloud server 6, the third cloud server 7, or the home gateway 4A may learn the air conditioning preferences of each user.

Also, in the first cloud server 5 or the third cloud server 7, the gender of the user may be estimated from the voice data based on the voice operation, and the operational skill level of the user who performed the voice operation may be determined by also taking into account the estimated gender. Also, the first cloud server 5 or the third cloud server 7 may be configured such that information containing a pre-registered age, gender, and voice data for each user is managed. In this case, the first cloud server 5 or the third cloud server 7 can acquire an accurate age and gender of the user who performed the voice operation. Furthermore, in the first cloud server 5 or the third cloud server 7, the frequency (for example, a daily average number of voice operations) of voice operations of each user may be managed. In this case, the first cloud server 5 or the third cloud server 7 may determine, based on the frequency of the voice operations of a user, the operational skill level of the user. Alternatively, the operational skill of a user may be registered in advance into the first cloud server 5 or the third cloud server 7 by the user or the representative of the home H.

Also, in the aforementioned embodiments, although the operational skill level is indicated as being three levels from 1 to 3, it is sufficient if there are two levels, and there may even be four or more levels.

Also, the voice inputting device 2 may transmit a control command to the air conditioner 3 in accordance with a command from the first cloud server 5, the second cloud server 6, the third cloud server 7, or the home gateway 4A.

Also, the user may input an operation for the voice inputting device 2 by creating a sound other than an utterance such as a hand clap or a whistle.

Also, a configuration may be set such that the air conditioner 3 executes a predetermined air conditioning setting (air conditioning to maintain an indoor temperature of 28° C., for example) for a case in which the sound detected by the voice inputting device 2 is a call or operation noise produced by a pet. Alternatively, if the sound detected by the voice inputting device 2 is a specific operation noise that is non-living, the apparatus to be controlled may be controlled based on the operation noise. For example, a configuration may be set such that brightness or color of a light gradually changes if the sound of a door opening or the alarm of a smartphone is detected.

Also, in order to ensure safety, for users from 0 to under 5 years old or 80 to any age above 80, various measures can be taken including decreasing the number of control target items for which instructions can be given by voice operation, narrowing the range from the minimum value to the maximum value for each control target item, and disabling voice operation.

Also, a configuration may be set such that the position of the user relative to the air conditioner 3 is specified and air conditioning is performed based on the specified position of the user. For example, the airflow direction of the air conditioner 3 may be adjusted such that air blows on the user when the user performs a "blow on me" voice operation. In a case where the air conditioner 3 is equipped with an infrared camera, the position of the user can be specified by analyzing a thermal image. Alternatively, in a case where the voice inputting device 2 is equipped with multiple microphones, the position of the user can be specified by the installation positions and directivity of the microphones.

Also, the user can perform voice operations in which a day of the week, date and time, and the like are designated. For example, if the user performs a "start operation at 6:15 a.m. on weekdays" voice operation, when the time becomes 6:15 a.m. on a weekday, the first cloud server 5 transmits, to the second cloud server 6, operation information instructing the air conditioner 3 to start operation. By doing this, the air conditioner 3 automatically starts operation when the time becomes 6:15 a.m. on a weekday. The first cloud server 5 may transmit operation information instructing the second cloud server 6 to start operation of the air conditioner 3 at 6:15 a.m. on weekdays, and the second cloud server 6 may cause the air conditioner 3 to start operation each time the time becomes 6:15 a.m. on a weekday.

Also, the first cloud server 5 may be included with functions for managing the schedule of a user. In this case, the user registers in advance into the first cloud server 5 a schedule indicating the date and time for events including when the user leaves the home and when the user returns to the home. If the user performs, for example, a "start operation upon returning home" voice operation, the first cloud server 5 transmits, to the second cloud server 6, operation information instructing to the air conditioner 3 to start operation when the time becomes the time of day at which the user returns home. By doing so, the air conditioner 3 automatically starts operation when the time becomes the date and time at which the user returns home as preregistered in the schedule. The second cloud server 6 may be included with functions for managing the schedule of the user.

Also, in the voice operation, a user with a high operational skill level may be given a greater number of variations of voice operations and a greater number of control target items than a user with a low operational skill level. Likewise, the range from the minimum value to the maximum value may be expanded for each control target item for the user with the high operational skill level.

In aforementioned Embodiment 1, the various functional components (refer to FIG. 7) of the first cloud server 5 are achieved by the processor 51 executing the program 540 stored in the secondary storage device 54. Likewise, the various functional components (refer to FIG. 11) of the second cloud server 6 are achieved by the processor 61 executing the program 640 stored in the secondary storage device 64. However, all or part of the functional components of the first cloud server 5 and the second cloud server 6 may be achieved by dedicated hardware. Examples of dedicated hardware include a single circuit, a composite circuit, a programmed processor, an application specific integrated circuit (ASIC), a field-programmable gate array (FPGA), and a combination thereof.

Also, the program 540 and the program 640 can be individually stored and distributed on a computer-readable recording medium such as a compact disc read-only memory (CD-ROM), a digital versatile disc (DVD), a magneto-optical (MO) disc, a universal serial bus (USB) memory, a memory card, a HDD, and the like. Further, by installation of the so-distributed program 540 on a specialized or general-purpose computer, the computer can be made to function as the first cloud server 5, and by installation of the so-distributed program 640 on a specialized or general-purpose computer, the computer can be made to function as the second cloud server 6.

Also, the program 540 may be stored in a storage device in a non-illustrated server on the Internet and the program 540 may then be downloaded from the server to the first cloud server 5, and the program 640 may be stored in a storage device in a non-illustrated server on the Internet and the program 640 may then be downloaded from the server to the second cloud server 6.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

INDUSTRIAL APPLICABILITY

The present disclosure can be suitably used for a system to control apparatuses installed in a home.

The invention claimed is:
1. An apparatus control system comprising:
a sound inputting device; and
an apparatus controller configured to control an apparatus, wherein:
the sound inputting device includes first processing circuitry to
input a sound operation of a user, and
transmit to the apparatus controller sound data based on the sound operation, and
the apparatus controller includes second processing circuitry to
upon receiving the sound data from the sound inputting device, (i) analyze the sound data, (ii) determine an operational skill level of the user and details of the sound operation, (iii) generate a control command for the apparatus based on the operational skill level and the details of the sound operation, and (iv) transmit the control command to the apparatus, and generate a first control command as the control command when the operational skill level is a first operational skill level, and generate a second control command that controls the apparatus by a smaller adjustment unit than the first control command as the control command when the operational skill level is a second operational skill level that is higher than the first operational skill level.

2. The apparatus control system according to claim 1, wherein:
the apparatus controller includes
a first cloud server, and
a second cloud server,
the first cloud server includes third processing circuitry to
receive the sound data from the sound inputting device,
analyze the sound data, and determine the operational skill level and the details of the sound operation of the user,
generate operation information including the operational skill level and the details of the sound operation, and
transmit the operation information to the second cloud server, and
the second cloud server includes fourth processing circuitry to
receive the operation information from the first cloud server,
generate a control command for the apparatus based on the operation information, and
transmit the control command to the apparatus.

3. The apparatus control system according to claim 1, wherein:
the apparatus controller is a third cloud server, and
the third cloud server includes fifth processing circuitry to
receive the sound data from the sound inputting device,
analyze the sound data, and determine the operational skill level and the details of the sound operation of the user,
generate a control command for the apparatus based on the operational skill level and the details of the sound operation, and
transmit the control command to the apparatus.

4. The apparatus control system according to claim 1, wherein:
the apparatus controller includes
a first cloud server, and
a home controller,
the first cloud server includes third processing circuitry to
receive the sound data from the sound inputting device,
analyze the sound data, and determine the operational skill level and the details of the sound operation of the user,
generate operation information including the operational skill level and the details of the sound operation, and
transmit the operation information to the home controller, and
the home controller includes sixth processing circuitry to
receive the operation information from the first cloud server,
generate a control command for the apparatus based on the operation information, and
transmit the control command to the apparatus.

5. The apparatus control system according claim 1, further comprising
a terminal configured to display an operation screen based on the operational skill level of the user.

6. An apparatus control method comprising:
inputting, by a sound inputting device, a sound operation of a user;
transmitting, by the sound inputting device, sound data based on the sound operation to an apparatus controller; and
upon receiving the sound data from the sound inputting device, by the apparatus controller, (i) analyzing the sound data, (ii) determining an operational skill level of the user and details of the sound operation, (iii) generating a control command for an apparatus based on the operational skill level and the details of the sound operation, and (iv) transmitting the control command to the apparatus,
wherein the apparatus controller generates a first control command as the control command when the operational skill level is a first operational skill level, and generates a second control command that controls the apparatus by a smaller adjustment unit than the first control command as the control command when the operational skill level is a second operational skill level that is higher than the first operational skill level.

* * * * *